United States Patent
Reichardt et al.

(10) Patent No.: US 10,570,316 B2
(45) Date of Patent: Feb. 25, 2020

(54) CHEMICAL MECHANICAL POLISHING (CMP) COMPOSITION

(71) Applicant: BASF SE, Ludwigshafen (DE)

(72) Inventors: Robert Reichardt, Ludwigshafen am Rhein (DE); Max Siebert, Ludwigshafen (DE); Yongqing Lan, Ludwigshafen (DE); Michael Lauter, Mannheim (DE); Haci Osman Guevenc, Heidelberg (DE); Julian Proelss, Worms (DE); Sheik Ansar Usman Ibrahim, Heverlee (BE); Reza Golzarian, Portland, OR (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/325,464

(22) PCT Filed: Jul. 14, 2015

(86) PCT No.: PCT/EP2015/066086
§ 371 (c)(1),
(2) Date: Jan. 11, 2017

(87) PCT Pub. No.: WO2016/008896
PCT Pub. Date: Jan. 21, 2016

(65) Prior Publication Data
US 2017/0158913 A1    Jun. 8, 2017

Related U.S. Application Data

(60) Provisional application No. 62/024,497, filed on Jul. 15, 2014.

(30) Foreign Application Priority Data

Aug. 19, 2014 (EP) .................................... 14181457

(51) Int. Cl.
*C09G 1/04* (2006.01)

(52) U.S. Cl.
CPC ..................... *C09G 1/04* (2013.01)

(58) Field of Classification Search
None
See application file for complete search history.

(56) References Cited

U.S. PATENT DOCUMENTS

| | | | |
|---|---|---|---|
| 5,230,833 A | 7/1993 | Romberger et al. | |
| 9,576,818 B2 * | 2/2017 | Miller | C09K 3/1463 |
| 2002/0005017 A1 | 1/2002 | Motonari et al. | |
| 2004/0148867 A1 | 8/2004 | Matsumi | |
| 2005/0233578 A1 * | 10/2005 | Jia | B23H 5/08 438/633 |
| 2006/0175298 A1 * | 8/2006 | Zhao | B24B 37/044 216/88 |
| 2008/0105651 A1 * | 5/2008 | Mabuchi | C09G 1/02 216/89 |
| 2009/0239380 A1 | 9/2009 | Tomiga et al. | |
| 2012/0156874 A1 | 6/2012 | Han et al. | |
| 2012/0264303 A1 | 10/2012 | Chen et al. | |
| 2013/0140273 A1 | 6/2013 | Lu et al. | |
| 2015/0104952 A1 * | 4/2015 | Cui | H01L 21/02063 438/745 |

FOREIGN PATENT DOCUMENTS

| | | |
|---|---|---|
| EP | 1 138 734 A2 | 10/2001 |
| EP | 2 592 122 A1 | 5/2013 |
| WO | WO 2004/063301 A1 | 7/2004 |

OTHER PUBLICATIONS

International Search Report dated Aug. 11, 2015 in PCT/EP2015/066086.
International Preliminary Report on Patentability and Written Opinion dated Jan. 17, 2017 in PCT/EP2015/066086.
Timo Kuntzsch, et al., "Characterization of Slurries Used for Chemical-Mechanical Polishing (CMP) in the Semiconductor Industry" Chem. Eng. Technol., vol. 26, No. 12, 2003, pp. 1235-1239.
B. C. Peethala, et al., "Cobalt Polishing with Reduced Galvanic Corrosion at Copper/Cobalt Interface Using Hydrogen Peroxide as an Oxidizer in Colloidal Silica-Based Slurries" Journal of the Electrochemical Society, vol. 159, Issue 6, 2012, pp. H582-H588.

* cited by examiner

*Primary Examiner* — Shamim Ahmed
(74) *Attorney, Agent, or Firm* — Oblon, McClelland, Maier & Neustadt, L.L.P.

(57) ABSTRACT

A chemical mechanical polishing (CMP) composition (Q) comprising (A) Colloidal or fumed inorganic particles (A) or a mixture thereof in a total amount of from 0.0001 to 2.5 wt.-% based on the total weight of the respective CMP composition (B) at least one amino acid in a total amount of from 0.2 to 1 wt.-% based on the total weight of the respective CMP composition (C) at least one corrosion inhibitor in a total amount of from 0.001 to 0.02 wt.-% based on the total weight of the respective CMP composition (D) hydrogen peroxide as oxidizing agent in a total amount of from 0.0001 to 2 wt.-% based on the total amount of the respective CMP composition (E) aqueous medium wherein the CMP composition (Q) has a pH in the range of from 6 to 9.5.

20 Claims, 4 Drawing Sheets

CHEMICAL MECHANICAL POLISHING (CMP) COMPOSITION

This invention essentially relates to a chemical mechanical polishing (CMP) composition and its use in polishing substrates of the semiconductor industry comprising cobalt or cobalt and copper and/or a cobalt alloy. The CMP composition according to the invention comprises inorganic particles, at least one amino acid, at least one corrosion inhibitor, hydrogen peroxide and aqueous medium. The CMP composition shows an improved and adjustable polishing performance.

In the semiconductor industry, chemical mechanical polishing (abbreviated as CMP) is a well-known technology applied in fabricating advanced photonic, microelectromechanical, and microelectronic materials and devices, such as semiconductor wafers.

During the fabrication of materials and devices used in the semiconductor industry, CMP is employed to planarize metal and/or oxide surfaces. CMP utilizes the interplay of chemical and mechanical action to achieve the planarity of the to-be-polished surfaces. Chemical action is provided by a chemical composition, also referred to as CMP composition or CMP slurry. Mechanical action is usually carried out by a polishing pad which is typically pressed onto the to-be-polished surface and mounted on a moving platen. The movement of the platen is usually linear, rotational or orbital.

In a typical CMP process step, a rotating wafer holder brings the to-be-polished wafer in contact with a polishing pad. The CMP composition is usually applied between the to-be-polished wafer and the polishing pad.

With the continuous shrink of feature size in ultra large scale integrated Circuits (ULSI) technology, the size of the copper interconnect structure is getting smaller and smaller. To reduce the RC delay, the thickness of barrier or adhesion layer in the copper interconnect structure is getting thinner. The traditional copper barrier/adhesion layer stack Ta/TaN is not suitable any more, as the resistivity of Ta is relatively high and copper cannot be directly electroplated onto Ta. Compared with Ta, cobalt has lower resistivity and is cheaper. The adhesion between Cu and Co is good. Cu can easily nucleate on Co, also copper can be directly electroplated on cobalt.

In integrated circuits, Co is used as adhesion or barrier layer for copper interconnects, while Co can also be used as nano-crystalline Co in memory device and as metal gate in MOSFET.

Porous low k dielectrics material has been already used in the current interconnect structures. It is reported that low k material can be easily damaged by plasma or polishing slurries. In current chemical mechanical polishing processing, to reduce the damage to low-k dielectrics, most of the current slurries used for copper and barriers are acidic. But it is observed that copper and cobalt easily suffered from dissolution in acidic solution containing oxidant for example hydrogen peroxide. This makes the polishing rate of copper and cobalt too high so that it will induce the dishing of copper lines. In addition the dissolution of the cobalt adhesion layer on the side-wall of the copper interconnect structure can lead to the delamination of copper lines and cause reliability problems.

The coexisting of Co, Cu and low k dielectric materials in different amounts and layer thickness depending on the used integration scheme in ultra large scale integrated Circuits (ULSI) technology gives up multiple challenges, in terms of selectivity, corrosion, removal rates and surface quality, to the compositions used for chemical mechanical polishing in the production of semiconductor devices.

In the state of the art, CMP compositions comprising inorganic particles, at least one amino acid, at least one corrosion inhibitor, hydrogen peroxide and water and its use in polishing substrates of the semiconductor industry comprising cobalt and or copper are known and described, for instance, in the following references.

J. Electrochem. Soc. 2012, Volume 159, Issue 6, Pages H582-H588 discloses a colloidal silica-based slurry with 5 wt % of abrasive 1 wt % $H_2O_2$ as the oxidizer and 0.5 wt % arginine as the complexing agent to polish cobalt (Co) with superior performance in terms of a better post-polish surface quality and no pit formation at pH 10. Addition of 5 mM BTA to this slurry inhibited Cu dissolution rates and yielded a Co/Cu removal rate ratio of ~1.2.

Microelectronic Engineering in press, online available since 13.02.2014 discloses the synergetic effect of $H_2O_2$ and glycine on cobalt CMP in weakly alkaline slurry.

US 2013/0140273 A1 discloses a slurry for chemical mechanical polishing of Co. The slurry-comprises 0.01-2% inhibitor, 0-5% oxidant, 0.1-10% abrasive, 0.001-10% complexing agent, and water. The pH value of the slurries is adjusted to 3-5 by a pH value adjustor. The inhibitor is chosen from one or more kinds of five-membered heterocycle compounds containing S and N atoms. The oxidant is one or more chosen from $H_2O_2$, $(NH_4)_2S_2O_8$, $KIO_4$, and $KClO_5$. The abrasive is one or more chosen from $SiO_2$, $CeO_2$, and $Al_2O_3$. The complexing agent is one or more chosen from amino acid and citric acid.

Consequently, it would be highly desirable to have a CMP composition and a CMP process at hand which could avoid all the disadvantages associated with the prior art, for example low material removal rate of Co, high Cu and/or Co corrosion and no selectivity control.

One of the objects of the present invention was to provide a CMP composition appropriate for the CMP of cobalt or cobalt and copper and/or a cobalt alloy comprising substrates and showing an improved polishing performance, particularly a controllable and adjustable selectivity between cobalt and copper. Furthermore, a CMP composition was sought that suppresses the corrosion of cobalt and copper, leads to high material removal rates, is compatible with the low k dielectric materials of the semiconductor substrates, gives a high quality surface finish, decreases dishing, is storage stable and would be ready-to-use in neutral to alkaline pH range. Furthermore, a respective CMP process was to be provided.

Accordingly, a CMP composition was found which comprises
  (A) colloidal or fumed inorganic particles (A) or a mixture thereof in a total amount of from 0.0001 to 2.5 wt.-% based on the total weight of the respective CMP composition
  (B) at least one amino acid in a total amount of from 0.2 to 1 wt.-% based on the total weight of the respective CMP composition
  (C) at least one corrosion inhibitor in a total amount of from 0.001 to 0.02 wt.-% based on the total weight of the respective CMP composition
  (D) hydrogen peroxide as oxidizing agent in a total amount of from 0.0001 to 2 wt.-% based on the total amount of the respective CMP composition
  (E) water
  wherein the CMP composition (Q) has a pH in the range of from 6 to 9.5.

In addition, the above-mentioned objects of the invention are achieved by a process for the manufacture of a semiconductor device comprising the chemical mechanical polishing of a substrate comprising a surface region containing or consisting of cobalt or cobalt and copper and/or of a cobalt alloy in the presence of said chemical mechanical polishing (CMP) composition (Q).

Moreover, the use of said CMP composition (Q) for chemical mechanical polishing of a substrate (S) used in the semiconductor industry, wherein the substrate (S) comprises (i) cobalt or (ii) cobalt and copper and/or (iii) a cobalt alloy has been found, which fulfills the objects of the invention.

Surprisingly, it could be found that the CMP composition (Q) according to the invention is showing an exceptional dependence of the copper material removing rate on the hydrogen peroxide concentration and therewith gives the opportunity to adjust the selectivity of cobalt to copper by varying the $H_2O_2$ concentration. Without being bound to this theory it is presently believed that this is due to the combination of a low abrasive concentration below 2.5 wt. % and a pH in the range of from 6 to 9.5.

Preferred embodiments are explained in the claims and the specification. It is understood that combinations of preferred embodiments are within the scope of the present invention.

According to the invention, the CMP composition comprises colloidal or fumed inorganic particles or a mixture thereof (A).

Generally, colloidal inorganic particles are inorganic particles which are produced by a wet precipitation process; fumed inorganic particles are produced by high temperature flame hydrolysis of for example metal chloride precursor with hydrogen in the presence of oxygen, for example using the Aerosil® process.

(A) can be
- of one type of colloidal inorganic particles,
- of one type of fumed inorganic particles,
- a mixture of different types of colloidal and/or fumed inorganic particles, According to the invention the amount of (A) in the CMP composition (Q) is not more than 2.5 wt. % based on the total weight of the composition (Q). Preferably not more than 2.0 wt. %, most preferably not more than 1.5 wt. %, particularly not more than 0.8 wt. %, based on the total weight of the composition (Q). According to the invention, the amount of (A) is at least 0.0001 wt. %, preferably at least 0.02 wt. %, more preferably at least 0.1 wt. %, most preferably at least 0.2 wt. %, particularly at least 0.3 wt. %, based on the total weight of the composition (Q). For example the amount of (A) can be in the range of from 0.4 wt. % to 1.2 wt. %.

Generally, the particles (A) can be contained in the composition (Q) in various particle size distributions. The particle size distribution of the particles (A) can be monomodal or multimodal. In case of multimodal particle size distribution, bimodal is often preferred. In order to have an easily reproducible property profile and easily reproducible conditions during the CMP process of the invention, a monomodal particle size distribution may be preferred for the particles (A). Often it is most preferred for the particles (A) to have a monomodal particle size distribution.

Generally which particle size distribution the particles (A) may have is not particularly limited.

The mean particle size of the particles (A) can vary within a wide range. The mean particle size is the $d_{50}$ value of the particle size distribution of the particles (A) in the aqueous medium (E) and can be measured for example using dynamic light scattering (DLS) or static light scattering (SLS) methods. These and other methods are well known in the art, see e.g. Kuntzsch, Timo; Witnik, Ulrike; Hollatz, Michael Stintz; Ripperger, Siegfried; Characterization of Slurries Used for Chemical-Mechanical Polishing (CMP) in the Semiconductor Industry; Chem. Eng. Technol; 26 (2003), volume 12, page 1235.

For DLS, typically a Horiba LB-550 V (DLS, dynamic light scattering measurement according to manual) or any other such instrument is used. This technique measures the hydrodynamic diameter of the particles as they scatter a laser light source ($\lambda$=650 nm), detected at an angle of 90° or 173° to the incoming light. Variations in the intensity of the scattered light are due to the random Brownian motion of the particles as they move through the incident beam and are monitored as a function of time. Autocorrelation functions performed by the instrument as a function of delay time are used to extract decay constants; smaller particles move with higher velocity through the incident beam and correspond to faster decays.

These decay constants are proportional to the diffusion coefficient, $D_t$, of the particle and are used to calculate particle size according to the Stokes-Einstein equation:

$$D_h = \frac{k_B T}{3\pi\eta D_t}$$

where the suspended particles are assumed to (1) have a spherical morphology and (2) be uniformly dispersed (i.e. not agglomerated) throughout the aqueous medium (E). This relationship is expected to hold true for particle dispersions that contain lower than 1% by weight of solids as there are no significant deviations in the viscosity of the aqueous dispersant (E), in which $\eta$=0.96 mPa·s (at T=22° C.). The particle size distribution of the fumed or colloidal inorganic particle dispersion (A) is usually measured in a plastic cuvette at 0.1 to 1.0% solid concentration and dilution, if necessary, is carried out with the dispersion medium or ultra-pure water.

Preferably, the mean particle size of the particles (A) is in the range of from 20 to 200 nm, more preferably in the range of from 25 to 180 nm, most preferably in the range of from 30 to 170 nm, particularly preferably in the range of from 40 to 160 nm, and in particular in the range of from 45 to 150 nm, as measured with dynamic light scattering techniques using instruments for example a High Performance Particle Sizer (HPPS) from Malvern Instruments, Ltd. or Horiba LB550.

The BET surface determined according to DIN ISO 9277:2010-09 of the particles (A) can vary within a wide range. Preferably, the BET surface of the particles (A) is in the range of from 1 to 500 m$^2$/g, more preferably in the range of from 5 to 250 m$^2$/g, most preferably in the range of from 10 to 100 m$^2$/g, in particular in the range of from 20 to 90 m$^2$/g, for example in the range of from 25 to 85 m$^2$/g.

The particles (A) can be of various shapes. Thereby, the particles (A) may be of one or essentially only one type of shape. However, it is also possible that the particles (A) have different shapes. For instance, two types of differently shaped particles (A) may be present. For example, (A) can have the shape of cubes, cubes with bevelled edges, octahedrons, icosahedrons, cocoons, nodules or spheres with or without protrusions or indentations. Preferably, they are essentially spherical, whereby typically these have protrusions or indentations.

It may be preferred that, the inorganic particles (A) are cocoon-shaped. The cocoons may be with or without protrusions or indentations. Cocoon-shaped particles are particles with a minor axis of from 10 to 200 nm, a ratio of major/minor axis of 1.4 to 2.2, more preferably of 1.6 to 2.0. Preferably they have an averaged shape factor of from 0.7 to 0.97, more preferably of from 0.77 to 0.92, preferably an averaged sphericity of from 0.4 to 0.9, more preferably of from 0.5 to 0.7 and preferably an averaged equivalent circle diameter of from 41 to 66 nm, more preferably of from 48 to 60 nm, which can be determined by transmission electron microscopy and scanning electron microscopy.

The determination of the shape factor, the sphericity and the equivalent circle diameter of cocoon-shaped particles is explained hereinbelow with reference to FIGS. 1 to 4.

Figure 1:
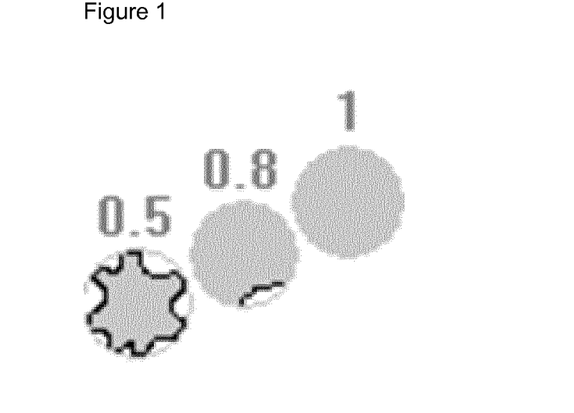
FIG. 1: Schematic illustration of the variation of the shape factor with the shape of a particle

The shape factor gives information on the shape and the indentations of an individual particle (see FIG. 1) and can be calculated according to the following formula:

$$\text{shape factor} = 4\pi(\text{area}/\text{perimeter}^2)$$

The shape factor of a spheric particle without indentations is 1. The value of shape factor decreases when the number of indentations increases.

Figure 2:
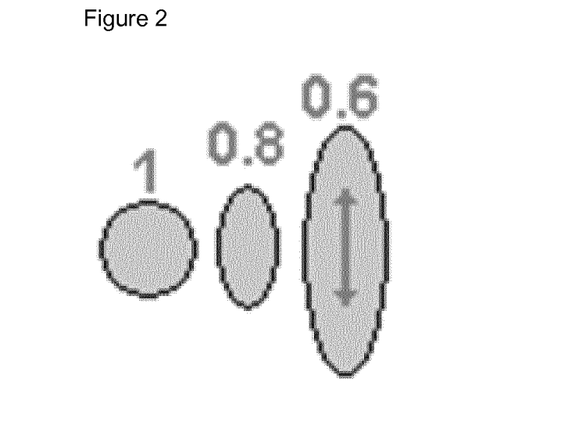
FIG. 2: Schematic illustration of the variation of the sphericity with the elongation of a particle

The sphericity (see FIG. 2) gives information on the elongation of an individual particle using the moment about the mean and can be calculated according to the following formula wherein M are the centres of gravity of the respective particle:

$$\text{sphericity} = (M_{xx} - M_{yy}) - [4M_{xy}^2 + (M_{yy} - M_{xx})^2]^{0.5} / (M_{xx} - M_{yy}) + [4M_{xy}^2 + (M_{yy} - M_{xx})^2]^{0.5} \quad \text{elongation} = (1/\text{sphericity})^{0.5}$$

wherein
$Mxx = \Sigma(x - x_{mean})^2 / N$
$Myy = \Sigma(y - y_{mean})^2 / N$
$Mxy = \Sigma[(x - y_{mean}) * (y - y_{mean})] / N$
N number of pixels forming the image of the respective particle
x, y coordinates of the pixels
$x_{mean}$ mean value of the x coordinates of the N pixels forming the image of said particle
$y_{mean}$ mean value of the y coordinates of the N pixels forming the image of said particle The sphericity of a spheric particle is 1. The value of the sphericity decreases when particles are elongated.

Figure 3:
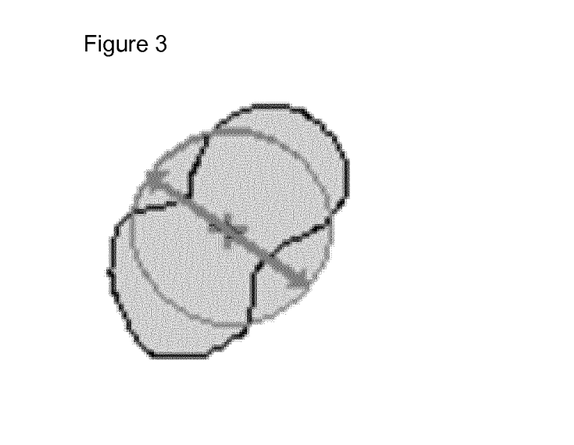
FIG. 3: Schematic illustration of the Equivalent Circle Diameter (ECD)
Figure 4:
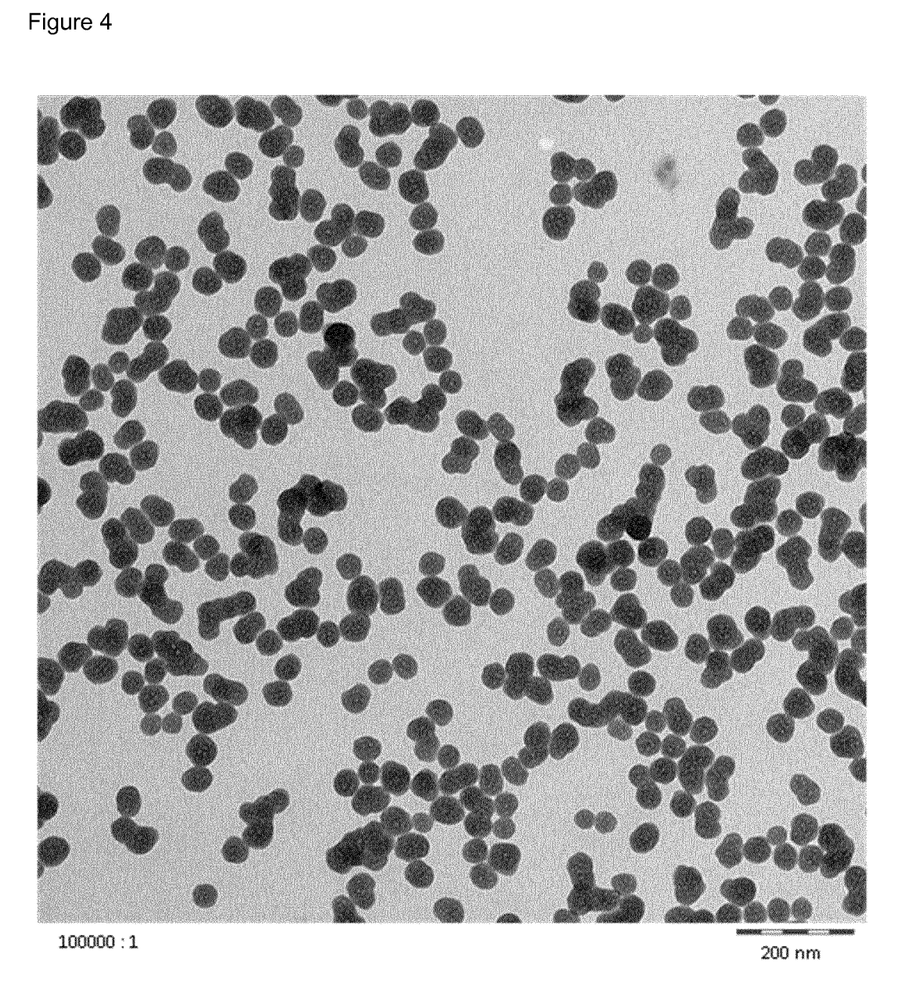
FIG. 4: Energy Filtered-Transmission Electron Microscopy (EF-TEM) (120 kilo volts) image of a dried cocoon-shaped silica particle dispersion with 20 wt. % solid content on a carbon foil

The equivalent circle diameter (also abbreviated as ECD in the following) of an individual non-circular particle gives information on the diameter of a circle which has the same area as the respective non-circular particle (see FIG. 3).

The averaged shape factor, averaged sphericity and averaged ECD are the arithmetic averages of the respective property related to the analyzed number of particles.

The procedure for particle shape characterization is as follows. An aqueous cocoon-shaped silica particle dispersion with 20 wt. % solid content is dispersed on a carbon foil and is dried. The dried dispersion is analyzed by using Energy Filtered-Transmission Electron Microscopy (EF-TEM) (120 kilo volts) and Scanning Electron Microscopy secondary electron image (SEM-SE) (5 kilo volts). The EF-TEM image (see FIG. 4) having a resolution of 2 k, 16 Bit, 0.6851 nm/pixel is used for the analysis. The images are binary coded using the threshold after noise suppression. Afterwards the particles are manually separated. Overlying and edge particles are discriminated and not used for the analysis. ECD, shape factor and sphericity as defined before are calculated and statistically classified.

For example, cocoon-shaped particles may be FUSO® PL-3 manufactured by Fuso Chemical Corporation having an average primary particle size (d1) of 35 nm and an average secondary particle size (d2) of 70 nm.

The chemical nature of particles (A) is not particularly limited. (A) may be of the same chemical nature or a mixture of particles of different chemical nature. As a rule, particles (A) of the same chemical nature are preferred.

Generally, (A) can be
  inorganic particles such as a metal, a metal oxide or carbide, including a metalloid, a metalloid oxide or carbide, or
  a mixture of inorganic particles.

It may be more preferable that the particles (A) are colloidal or fumed inorganic particles or a mixture thereof. Among them, oxides and carbides of metals or metalloids are preferred. More preferably, particles (A) are alumina, ceria, copper oxide, iron oxide, nickel oxide, manganese oxide, silica, silicon nitride, silicon carbide, tin oxide, titania, titanium carbide, tungsten oxide, yttrium oxide, zirconia, or mixtures or composites thereof. Most preferably, particles (A) are alumina, ceria, silica, titania, zirconia, or mixtures or composites thereof. In particular, particles (A) are silica. For example, particles (A) are colloidal silica.

As used herein, the term "colloidal silica" refers to silicon dioxide that has been prepared by condensation polymerization of $Si(OH)_4$. The precursor $Si(OH)_4$ can be obtained, for example, by hydrolysis of high purity alkoxysilanes, or by acidification of aqueous silicate solutions. Such colloidal silica can be prepared in accordance with U.S. Pat. No. 5,230,833 or can be obtained as any of various commercially available products, such as the Fuso® PL-1, PL-2, and PL-3 products, and the Nalco® 1050, 2327 and 2329 products, as well as other similar products available from DuPont, Bayer, Applied Research, Nissan Chemical or Clariant.

According to the invention, the CMP composition comprises at least one amino acid (B).

Generally organic compounds that have an amino group and an acid group are referred to as amino acids. For the purposes of this invention, all individual stereoisomers and racemic mixtures thereof are also contemplated for the amino acids. It may be preferred that both the amino and the acid groups are attached to one carbon (termed as alpha-amino carboxylic acids) are used as the chemical additive in the CMP slurry. Many alpha-amino carboxylic acids are known and there are twenty "natural" amino acids which are used as basic components of proteins in living organisms. The amino acids can be hydrophilic, neutral or hydrophobic depending on their side chains in presence of an aqueous carrier. The addition of alpha amino acid as polishing additive may increase the metal material removal rates The at least one alpha-amino acid (B) may be represented by the formula (I)

$$H_2N-CR^1R^2COOH \qquad (I)$$

wherein $R^1$ and $R^2$ are independently from each other hydrogen, cyclic, branched and straight chain moieties having from 1 to 8 carbon atoms that are unsubstituted or substituted with one or more substituents selected from nitrogen containing substituents, oxygen containing substituents and sulfur containing substituents including but not limited to —COOH, —$CONH_2$, —$NH_2$, —S—, —OH, —SH, and mixtures and salts thereof.

Preferably, the at least one amino acid (B) is alpha-alanine, arginine, aspartic acid, cystine, cysteine, glutamine, glutamic acid, glycine, histidine, isoleucine, leucine, lysine, methionine, phenylalanine, proline, serine, threonine, tryptophan, tyrosine, valine, and mixtures and salts thereof. More preferably (B) is alpha-alanine, arginine, aspartic acid, glutamic acid, glycine, histidine, leucine, lysine, proline, serine, valine, and mixtures and salts thereof. Most preferably (B) is alpha-alanine, aspartic acid, glutamic acid, glycine, proline, serine, and mixtures and salts thereof, particularly (B) is alpha-alanine, aspartic acid, glycine and mixtures and salts thereof, for example (B) is glycine.

According to the invention the amount of the amino acid (B) in the CMP composition (Q) is not more than 1 wt. % based on the total weight of the composition (Q). More preferably not more than 0.9 wt. %, most preferably not more than 0.85 wt. %, particularly not more than 0.8 wt. %, based on the total weight of the composition (Q). According to the invention, the amount of (B) is at least 0.2 wt. % based on the total weight of the composition (Q). Preferably at least 0.3 wt. %, more preferably at least 0.4 wt. %, most preferably at least 0.5 wt. %, particularly at least 0.6 wt. %, based on the total weight of the composition (Q). For example the amount of (B) can be in the range of from 0.65 wt. % to 0.78 wt. %.

According to the invention, the CMP composition (Q) comprises at least one corrosion inhibitor. For example two corrosion inhibitors may be comprised in the CMP composition (Q).

Generally, a corrosion inhibitor is a compound that can protect the surface of a metal, e.g. copper by forming a protective molecular layer on the metal surface.

Corrosion inhibitors (C) can for instance be diazoles, triazoles, tetrazoles and their derivatives. Preferably, the at least one corrosion inhibitor (C) may for example be 1,2,4 triazole, 1,2,3 triazole, 3-amino-methyl-1H-1,2,4-triazole, benzotriazole, 4-methyl benzotriazole, 5-methyl benzotriazole, 5-6-dimethyl benzotriazole, 5-chloro benzotriazole, 1-octanyl benzotriazole, carboxy-benzotriazole, butyl-benzotriazole, 6-ethyl-1H-1,2,4 benzotriazole, (1-pyrrolidinyl methyl) benzotriazole, 1-n-butyl-benzotriazole, benzotriazole-5-carboxylic acid, 4,5,6,7-tetrahydro-1H-benzotriazole, imidazole, benzimidazole and their derivatives and mixtures thereof, more preferably the at least one corrosion inhibitor (C) may for example be 1,2,4 triazole, 1,2,3 triazole, benzotriazole, 4-methyl benzotriazole, 5-methyl benzotriazole, 5-6-dimethyl benzotriazole, 5-chloro benzotriazole, 1-n-butyl-benzotriazole, benzotriazole-5-carboxylic acid, 4,5,6,7-tetrahydro-1H-benzotriazole, imidazole, benzimidazole and their derivatives and mixtures thereof, most preferably the at least one corrosion inhibitor (C) may for example be 1,2,4 triazole, benzotriazole, 5-methyl benzotriazole, 5-chloro benzotriazole, benzotriazole-5-carboxylic acid, 4,5,6,7-tetrahydro-1H-benzotriazole, imidazole and their derivatives and mixtures thereof, particularly the at least one corrosion inhibitor (C) may for example be 1,2,4 triazole, benzotriazole, 5-methyl benzotriazole, 5-chloro benzotriazole, imidazole and their derivatives and mixtures thereof, for example 1H-benzotriazole.

According to the invention the amount of (C) in the CMP composition (Q) is not more than 0.02 wt. % based on the total weight of the composition (Q). Preferably not more than 0.018 wt. %, most preferably not more than 0.016 wt. %, particularly not more than 0.014 wt. %, based on the total weight of the composition (Q). According to the invention, the amount of (C) is at least 0.001 wt. %, preferably at least 0.002 wt. %, more preferably at least 0.005 wt. %, most preferably at least 0.007 wt. %, particularly at least 0.008 wt. %, based on the total weight of the composition (Q). For example the amount of (C) can be in the range of from 0.009 wt. % to 0.012 wt. %.

According to the invention the CMP composition (Q) comprises hydrogen peroxide (D) as oxidizing agent.

In general, the oxidizing agent is a compound which is capable of oxidizing the to-be-polished substrate or one of its layers.

According to the invention the amount of (D) in the CMP composition (Q) is not more than 2 wt. %, preferably not more than 1.5 wt. %, more preferably not more than 1.4 wt. %, most preferably not more than 1.3 wt. %, particularly not more than 1.2 wt. %, based on the total weight of the composition (Q). According to the invention, the amount of (D) is at least 0.0001 wt. %, preferably at least 0.03 wt. %, more preferably at least 0.08 wt. %, most preferably at least 0.1 wt. %, particularly at least 0.2 wt. %, based on the total weight of the composition (Q). For example the amount of (D) can be in the range of from 0.02 wt. % to 0.1 wt. %, of from 0.15 wt. % to 0.8 wt. %, of from 0.8 wt. % to 1.9 wt. %, based on the total weight of the composition (Q).

According to the invention the CMP composition comprises an aqueous medium (E). (E) can be of one type or a mixture of different types of aqueous media.

In general, the aqueous medium (E) can be any medium which contains water. Preferably, the aqueous medium (E) is a mixture of water and an organic solvent miscible with water (e.g. an alcohol, preferably a $C_1$ to $C_3$ alcohol, or an alkylene glycol derivative). More preferably, the aqueous medium (E) is water. Most preferably, the aqueous medium (E) is de-ionized water.

If the amounts of the components other than (E) are in total x % by weight of the CMP composition, then the amount of (E) is (100-x) % by weight of the CMP composition (Q).

The properties of the CMP composition according to the invention respectively, such as stability, polishing performance and etching behavior of the composition as against different materials, for example metals vs. silicon dioxide, may depend on the pH of the corresponding composition.

According to the invention the CMP composition (Q) has a pH in the range of from 6 to 9.5. Preferably, the pH value of the compositions used or according to the invention respectively is in the range of from 6.8 to 9.2, more preferably from 7 to 8.8, most preferably from 7.3 to 8.7, particularly preferably from 7.5 to 8.5, for example from 7.6 to 8.4.

The CMP composition (Q) of the invention can further optionally contain at least one non-ionic surfactant (F).

Generally, a surfactant used in a CMP composition is a surface-active compound which decreases the surface tension of a liquid, the interfacial tension between two liquids, or that between a liquid and a solid.

In general, any non-ionic surfactant (F) can be used.

The non-ionic surfactant (F) is preferably water-soluble and/or water-dispersible, more preferably water-soluble. "Water-soluble" means that the relevant component or ingredient of the composition of the invention can be dissolved in the aqueous phase on the molecular level. "Water-dispersible" means that the relevant component or ingredient of the composition of the invention can be dispersed in the aqueous phase and forms a stable emulsion or suspension.

The non-ionic surfactant (F) is preferably an amphiphilic non-ionic surfactant, i.e. a surfactant which comprises at least one hydrophobic group (b1) and at least one hydrophilic group (b2). This means that the nonionic surfactant (F) can comprise more than one hydrophobic group (b1), e.g., 2, 3 or more groups (b1), which are separated from each other by at least one hydrophilic group (b2) as hereinbelow described. This also means that the nonionic surfactant (F) can comprise more than one hydrophilic group (b2), e.g., 2, 3 or more groups (b2) which are separated from each other by hydrophobic groups (b1) as hereinbelow described.

Therefore, the nonionic surfactant (F) can have different blocklike general structures. Examples of such general blocklike structures are:
b1-b2,
b1-b2-b1,
b2-b1-b2,
b2-b1-b2-b1,
b1-b2-b1-b2-b1, and
b2-b1-b2-b1-b2.

The non-ionic surfactant (F) is more preferably an amphiphilic non-ionic surfactant comprising a polyoxyalkylene group.

The hydrophobic group (b1) is preferably an alkyl group, more preferably an alkyl group having 4 to 40, most preferably 5 to 20, particularly preferably 7 to 18, in particular 10 to 16, for example 11 to 14 carbon atoms.

The hydrophilic group (b2) is preferably a polyoxyalkylene group. Said polyoxyalkylene groups can be oligomeric or polymeric. More preferably, the hydrophilic group (b2) is a hydrophilic group selected from the group consisting of polyoxyalkylene groups comprising
(b21) oxyalkylene monomer units, and
(b22) oxyalkylene monomer units other than oxyethylene monomer units,
said monomer units (b21) being not identical to monomer units (b22), and said polyoxyalkylene group of (b2) containing the monomer units (b21) and (b22) in random, alternating, gradient and/or block-like distribution.

Most preferably, the hydrophilic group (b2) is a hydrophilic group selected from the group consisting of polyoxyalkylene groups comprising
(b21) oxyethylene monomer units, and
(b22) oxyalkylene monomer units other than oxyethylene monomer units,
said polyoxyalkylene group of (b2) containing the monomer units (b21) and (b22) in random, alternating, gradient and/or block-like distribution.

Preferably, the oxyalkylene monomer units other than oxyethylene monomer units (b22) are substituted oxyalkylene monomer units wherein the substituents are selected from the group consisting of alkyl, cycloalkyl, aryl, alkyl-cycloalkyl, alkyl-aryl, cycloalkyl-aryl and alkyl-cycloalkyl-aryl groups. The oxyalkylene monomer units other than oxyethylene monomer units (b22) are
more preferably derived from substituted oxiranes (X) wherein the substituents are selected from the group consisting of alkyl, cycloalkyl, aryl, alkyl-cycloalkyl, alkyl-aryl, cycloalkyl-aryl and alkyl-cycloalkyl-aryl groups,
most preferably derived from alkyl-substituted oxiranes (X),
particularly preferably derived from substituted oxiranes (X) wherein the substituents are selected from the group consisting of alkyl groups having 1 to 10 carbon atoms,
for example derived from methyl oxirane (propyleneoxide) and/or ethyl oxirane (butylene oxide).

The substituents of the substituted oxiranes (X) themselves can also carry inert substituents, i.e., substituents which do not adversely affect the copolymerization of the oxiranes (X) and the surface activity of the non-ionic surfactants (F). Examples of such inert substituents are fluorine and chlorine atoms, nitro groups and nitrile groups. If such inert substituents are present, they are used in such amounts that they do not adversely affect the hydrophilic-hydrophobic balance of the non-ionic surfactant (F). Preferably, the substituents of the substituted oxiranes (X) do not carry such inert substituents.

The substituents of the substituted oxiranes (X) are preferably selected from the group consisting of alkyl groups having 1 to 10 carbon atoms, cycloalkyl groups having 5 to 10 carbon atoms in spirocyclic, exocyclic and/or annealed configuration, aryl groups having 6 to 10 carbon atoms, alkyl-cycloalkyl groups having 6 to 20 carbon atoms, alkyl-aryl groups having 7 to 20 carbon atoms, cycloalkyl-aryl group 11 to 20 carbon atoms, and alkyl-cycloalkyl-aryl groups having 12 to 30 carbon atoms. Most preferably, the substituents of the substituted oxiranes (X) are selected from the group consisting of alkyl groups having 1 to 10 carbon atoms. Particularly, the substituents of the substituted oxiranes (X) are selected from the group consisting of alkyl groups having 1 to 6 carbon atoms.

Examples for the most preferred substituted oxiranes (X) are methyl oxirane (propyleneoxide) and/or ethyl oxirane (butylene oxide), particularly methyl oxirane.

Most preferably, the hydrophilic group (b2) consists of the monomer units (b21) and (b22).

In another embodiment, the hydrophilic group (b2) is preferably a polyoxyethylene, polyoxypropylene or polyoxybutylene group, more preferably a polyoxyethylene group.

In case that the hydrophilic group (b2) comprises or consists of the monomer units (b21) and (b22), the polyoxyalkylene group—acting as hydrophilic group (b2)—contains the monomer units (b21) and (b22) in random, alternating, gradient and/or blocklike distribution. This means, that one hydrophilic group (b2) can have only one type of distribution, i.e.,
random: . . . -b21-b21-b22-b21-b22-b22-b22-b21-b22- . . . ;
alternating: . . . -b21-b22-b21-b22-b21- . . . ;
gradient: . . . b21-b21-b21-b22-b21-b22-b22-b21-b22-b22-b22- . . . ; or
blocklike: . . . -b21-b21-b21-b22-b22-b22- . . . .

Alternatively, the hydrophilic group (b2) can also contain at least two types of distributions, e.g., an oligomeric or polymeric segment having a random distribution and an oligomeric or polymeric segment having alternating distribution. Most preferably, the hydrophilic group (b2) preferably has only one type of distribution, and most preferably, said distribution is random or blocklike.

In the embodiments where the hydrophilic group (b2) comprises or consists of the monomer units (b21) and (b22), the molar ratio of (b21) to (b22) can vary broadly and, therefore, can be adjusted most advantageously to the particular requirements of the composition, the process and the use of the invention. Preferably the molar ratio (b21):(b22) is from 100:1 to 1:1, more preferably, from 60:1 to 1.5:1 and, most preferably, from 50:1 to 1.5:1, and particularly preferably, from 25:1 to 1.5:1, and particularly, from 15:1 to 2:1, and for example, from 9:1 to 2:1.

Also the degree of polymerization of the oligomeric and polymeric polyoxyalkylene groups—acting as hydrophilic groups (b2)—can vary broadly and, therefore, can be adjusted most advantageously to the particular requirements of the composition, the process and the use of the invention. Preferably, the degree of polymerization is in the range of from 5 to 100, preferably 5 to 90, and most preferably, 5 to 80.

Particularly, the non-ionic surfactant (F) is an amphiphilic non-ionic polyoxyethylene-polyoxypropylene alkyl ether surfactant which is a mixture of molecules containing, on the average, an alkyl group having 10 to 16 carbon atoms and 5 to 20 oxyethylene monomer units (b21) and 2 to 8 oxypropylene monomer units in random distribution. For example, the non-ionic surfactant (F) is an amphiphilic non-ionic polyoxyethylene-polyoxypropylene alkyl ether surfactant which is a mixture of molecules containing, on the average, an alkyl group having 11 to 14 carbon atoms and 12 to 20 oxyethylene monomer units and 3 to 5 oxypropylene monomer units in random distribution.

The non-ionic surfactant (F) if present can be contained in varying amounts in the CMP composition (Q). Preferably, the amount of (F) is not more than 10 wt. %, more preferably not more than 3 wt. %, most preferably not more than 1 wt. %, particularly preferably not more than 0.5 wt. %, particularly not more than 0.1 wt. %, for example not more than 0.05 wt. %, based on the total weight of the composition (Q). Preferably, the amount of (F) is at least 0.00001 wt. %, more preferably at least 0.0001 wt. %, most preferably at least 0.0008 wt. %, particularly preferably at least 0.002 wt. %, particularly at least 0.005 wt. %, for example at least 0.008 wt. %, based on the total weight of the composition (Q).

Generally, the non-ionic surfactant (F) can have different weight average molecular weights. The weight average molecular weight of (F) is preferably at least 300, more preferably at least 500, most preferably at least 700, particularly at least 800, for example at least 900. The weight average molecular weight of (F) is preferably not more than 15,000, more preferably not more than 6,000, most preferably not more than 3,000, particularly not more than 2,000, for example not more than 1,400 [g/mol], as determined by gel permeation chromatography (abbreviated as "GPC" in the following). In particular, the weight average molecular weight of (F) is from 900 to 1,400 [g/mol] as determined by GPC. Said GPC are standard GPC techniques known to the person skilled of the art.

In general, the solubility of non-ionic surfactant (F) in an aqueous medium can vary within a wide range. The solubility of (F) in water at pH 7 at 25° C. under atmospheric pressure is preferably at least 1 g/L, more preferably at least 5 g/L, most preferably at least 20 g/L, particularly at least 50 g/L, for example at least 150 g/L. Said solubility can be determined by evaporating the solvent and measuring the remaining mass in the saturated solution.

The CMP composition of the invention can further optionally contain at least one additional complexing agent (G) different from the at least one amino acid (B), for example one complexing agent. In general, the complexing agent is a compound which is capable of complexing the ions of the to-be-polished substrate or of one of its layers. Preferably, (G) is a carboxylic acid having at least one COOH groups, an N-containing carboxylic acid, N-containing sulfonic acid, N-containing sulfuric acid, N-containing phosphonic acid, N-containing phosphoric acid, or a salt thereof. More preferably, (G) is a carboxylic acid having at least two COOH groups, an N-containing carboxylic acid, or a salt thereof. For example the at least one additional complexing agent (G) can be acetic acid, gluconic acid, lactic acid, nitriloacetic acid, ethylenediaminetetraacetic acid (EDTA), imino-disuccinic acid, glutaric acid, citric acid, malonic acid, 1,2,3,4-butanetetracarboxylic acid, fumaric acid, tartaric acid, succinic acid and phytic acid.

If present, the complexing agent (G) can be contained in varying amounts. Preferably, the amount of (G) is not more than 20 wt. %, more preferably not more than 10 wt. %, most preferably not more than 5 wt. %, for example not more than 2 wt. %, based on the total weight of the corresponding composition. Preferably, the amount of (G) is at least 0.05 wt. %, more preferably at least 0.1 wt. %, most preferably at least 0.5 wt. %, for example at least 1 wt. %, based on the total weight of the corresponding composition.

The CMP composition of the invention can further optionally contain at least one biocide (H), for example one biocide. In general, the biocide is a compound which deters, renders harmless, or exerts a controlling effect on any harmful organism by chemical or biological means. Preferably, (H) is an quaternary ammonium compound, an isothiazolinone-based compound, an N-substituted diazenium dioxide, or an N'-hydroxy-diazenium oxide salt. More preferably, (H) is an N-substituted diazenium dioxide, or an N'-hydroxy-diazenium oxide salt.

If present, the biocide (H) can be contained in varying amounts. If present, the amount of (H) is preferably not more than 0.5 wt. %, more preferably not more than 0.1 wt. %, most preferably not more than 0.05 wt. %, particularly not more than 0.02 wt. %, for example not more than 0.008 wt. %, based on the total weight of the corresponding composition. If present, the amount of (H) is preferably at least 0.0001 wt. %, more preferably at least 0.0005 wt. %, most preferably at least 0.001 wt. %, particularly at least 0.003 wt. %, for example at least 0.006 wt. %, based on the total weight of the corresponding composition.

The CMP compositions according to the invention respectively may also contain, if necessary, various other additives, including but not limited to pH adjusting agents, stabilizers etc. Said other additives are for instance those commonly employed in CMP compositions and thus known to the person skilled in the art. Such addition can for example stabilize the dispersion, or improve the polishing performance, or the selectivity between different layers.

If present, said additive can be contained in varying amounts. Preferably, the amount of said additive is not more than 10 wt. %, more preferably not more than 1 wt. %, most preferably not more than 0.1 wt. %, for example not more than 0.01 wt. %, based on the total weight of the corresponding composition. Preferably, the amount of said additive is at least 0.0001 wt. %, more preferably at least 0.001 wt. %, most preferably at least 0.01 wt. %, for example at least 0.1 wt. %, based on the total weight of the corresponding composition.

A semiconductor device can be manufactured by a process which comprises the CMP of a substrate in the presence of the CMP composition of the invention. According to the invention said process comprises the CMP of a substrate comprising a surface region containing or consisting of cobalt or cobalt and copper and/or of a cobalt alloy.

Generally, the semiconductor device which can be manufactured by the process according to the invention is not particularly limited. Thus the semiconductor devices can be an electronic component comprising semiconducting materials, as for example silicon, germanium, and III-V materials. Semiconductor devices can be those which are manufactured as single discrete devices or those which are manufactured as integrated circuits (ICs) consisting of a number of devices manufactured and interconnected on a wafer. Semiconductor devices can be two terminal devices for example a diode, three terminal devices for example a bipolar transistor, four terminal devices for example a Hall effect sensor or multi-terminal devices. Preferably, said semiconductor device is a multi-terminal device. Multi-terminal devices can be logic devices as integrated circuits and microprocessors or memory devices as random access memory (RAM), read only memory (ROM) and phase change random access memory (PCRAM). Preferably said semiconductor device is a multi-terminal logic device. In particular said semiconductor device is an integrated circuit or microprocessor.

Generally, in integrated circuits Co is used as adhesion or barrier layer for copper interconnects. In its nano-crystalline form Co is contained for example in memory devices and as metal gate in MOSFET. Cobalt can also be used as a seed to enable plating of copper by electro-deposition. Cobalt or a cobalt alloy can also be used as wiring instead of copper for one or more layers. For example a capacitor (CAP) can be formed by successive layers of metal, insulator, metal (MIM) and a thin film resistor at the same level. Circuit designers can now wire to the TaN thin film resistor at the lowest metal level, which reduces parasitics and allows more efficient usage of the existing wiring levels. The excess copper and/or cobalt and the adhesion/barrier layer comprising Co in form of, for example metal nitrides or metal carbon nitrides, such as Co/TaN, Co/TiN, Co/TaCN, Co/TiCN, or for example as a single cobalt alloy layer, such as CoMo, CoTa, CoTi and CoW above the dielectrics, can be removed by the chemical mechanical polishing process according to the invention.

Generally, this cobalt and/or cobalt alloy can be produced or obtained in different ways. Cobalt or cobalt alloys can be produced by ALD, PVD or CVD processes. It is possible that cobalt or the cobalt alloy is deposited onto a barrier material. Proper materials for barrier application are well known in the arts. The barrier prevents metal atoms or ions like cobalt or copper from diffusing into the dielectric layer and improves the adhesion properties of the conductive layer. Ta/TaN, Ti/TiN can be used.

Generally, this cobalt and/or cobalt alloy can be of any type, form, or shape. This cobalt and/or cobalt alloy preferably has the shape of a layer and/or overgrowth. If this cobalt and/or cobalt alloy has the shape of a layer and/or overgrowth, the cobalt and/or cobalt alloy content is preferably more than 90%, more preferably more than 95%, most preferably more than 98%, particularly more than 99%, for example more than 99.9% by weight of the corresponding layer and/or overgrowth. This cobalt and/or cobalt alloy has been preferably filled or grown in trenches or plugs between other substrates, more preferably filled or grown in trenches or plugs in dielectric materials like for example $SiO_2$, silicon, low-k (BD1, BD2) or ultra low-k materials, or other isolating and semiconducting material used in the semiconductor industry.

Generally, the down pressure or down force is a downward pressure or a downward force which is applied by the carrier to the wafer pressing it against the pad during CMP. This down pressure or down force can for example be measured in pound per square inch (abbreviated as psi)

According to the process of the invention the down pressure is 2 psi or lower. Preferably the down pressure is in the range of from 0.1 to 1.9 psi, more preferably in the range of from 0.3 to 1.8 psi, most preferably in the range of from 0.4 to 1.7 psi, particularly preferable in the range of from 0.8 to 1.6 psi, for example 1.3 psi.

If the process of the invention comprises the chemical mechanical polishing of a substrate comprising a surface region containing or consisting of cobalt and copper, the selectivity of cobalt to copper with regard to the material removal rate is preferably higher than 0.05, more preferably higher than 0.2, most preferably higher than 1, particularly higher than 2.5, especially higher than 20, for example higher than 40. This selectivity profile can be adjusted for example by varying the concentration of hydrogen peroxide (D), the concentration of the corrosion inhibitor (C) and the concentration of the abrasive (A) of the CMP composition (Q).

The CMP composition (Q) used according to the invention is for chemical-mechanical polishing of a substrate used in the semiconductor industry comprising cobalt or cobalt and copper and/or of a cobalt alloy.

The cobalt and/or cobalt alloy can be of any type, form, or shape. The cobalt and/or cobalt alloy preferably has the shape of a layer and/or overgrowth. If this cobalt and/or cobalt alloy has the shape of a layer and/or overgrowth, the cobalt and/or cobalt alloy content is preferably more than 90%, more preferably more than 95%, most preferably more than 98%, particularly more than 99%, for example more than 99.9% by weight of the corresponding layer and/or overgrowth. The cobalt and/or cobalt alloy has been preferably filled or grown in trenches or plugs between other substrates, more preferably filled or grown in trenches or plugs in dielectric materials like for example $SiO_2$, silicon, low-k (BD1, BD2) or ultra low-k materials, or other isolating and semiconducting material used in the semiconductor industry. For example in the Through Silicon Vias (TSV) middle process insolated materials such as polymers, photoresist and/or polyimide can be used as insulating material between the subsequent processing steps of wet etch and CMP for insulating/isolating properties after revealing the TSV from the backside of the wafer. Between the copper comprising and the dielectric material can be a thin layer of a barrier material. Generally barrier materials to prevent metal ions from diffusing into the dielectric material can for example be Ti/TiN, Ta/TaN or Ru or Ru-alloys, Co or Co-alloys.

If the CMP composition (Q) according to the invention is used for polishing a substrate comprising cobalt and copper, the selectivity of cobalt to copper with regard to the material removal rate is preferably higher than 0.05, more preferably higher than 0.2, most preferably higher than 1, particularly higher than 2.5, especially higher than 20, for example higher than 40.

The selectivity may be advantageously be adjusted by the combination of high material removal rate (MRR) of cobalt and low MRR of copper or the other way round.

Examples of CMP compositions (Q) according to the invention

Z1:
- (A) Colloidal or fumed inorganic particles (A) or a mixture thereof in a total amount of from 0.05 to 0.9 wt.-% based on the total weight of the respective CMP composition
- (B) at least one amino acid in a total amount of from 0.2 to 0.9 wt.-% based on the total weight of the respective CMP composition
- (C) at least one corrosion inhibitor in a total amount of from 0.008 to 0.02 wt.-% based on the total weight of the respective CMP composition
- (D) hydrogen peroxide as oxidizing agent in a total amount of from 0.0001 to 0.1 wt.-% based on the total amount of the respective CMP composition
- (E) aqueous medium wherein the CMP composition (Q) has a pH in the range of from 7.1 to 9.

Z2:
- (A) Colloidal inorganic particles (A) in a total amount of from 0.0001 to 2.5 wt.-% based on the total weight of the respective CMP composition (B) at least one amino acid in a total amount of from 0.2 to 1 wt.-% based on the total weight of the respective CMP composition
(C) at least one corrosion inhibitor in a total amount of from 0.001 to 0.02 wt.-% based on the total weight of the respective CMP composition
(D) hydrogen peroxide as oxidizing agent in a total amount of from 0.0001 to 2 wt.-% based on the total amount of the respective CMP composition
(E) aqueous medium
wherein the CMP composition (Q) has a pH in the range of from 6 to 9.5.

Z3:
(A) Fumed inorganic particles (A) in a total amount of from 0.0001 to 2.5 wt.-% based on the total weight of the respective CMP composition
(B) at least one amino acid in a total amount of from 0.2 to 1 wt.-% based on the total weight of the respective CMP composition
(C) at least one corrosion inhibitor in a total amount of from 0.001 to 0.02 wt.-% based on the total weight of the respective CMP composition
(D) hydrogen peroxide as oxidizing agent in a total amount of from 0.0001 to 2 wt.-% based on the total amount of the respective CMP composition
(E) aqueous medium
wherein the CMP composition (Q) has a pH in the range of from 6 to 9.5.

Z4:
(A) Colloidal silica particles (A) in a total amount of from 0.0001 to 2.5 wt.-% based on the total weight of the respective CMP composition
(B) at least one amino acid in a total amount of from 0.2 to 1 wt.-% based on the total weight of the respective CMP composition
(C) at least one corrosion inhibitor in a total amount of from 0.001 to 0.02 wt.-% based on the total weight of the respective CMP composition
(D) hydrogen peroxide as oxidizing agent in a total amount of from 0.0001 to 2 wt.-% based on the total amount of the respective CMP composition
(E) aqueous medium
wherein the CMP composition (Q) has a pH in the range of from 6 to 9.5.

Z5:
(A) Colloidal silica particles (A) in a total amount of from 0.0001 to 2.5 wt.-% based on the total weight of the respective CMP composition, wherein the mean particle size of the particles (A) is from 20 nm to 200 nm, as determined by dynamic light scattering techniques.
(B) at least one amino acid in a total amount of from 0.2 to 1 wt.-% based on the total weight of the respective CMP composition
(C) at least one corrosion inhibitor in a total amount of from 0.001 to 0.02 wt.-% based on the total weight of the respective CMP composition
(D) hydrogen peroxide as oxidizing agent in a total amount of from 0.0001 to 2 wt.-% based on the total amount of the respective CMP composition
(E) aqueous medium
wherein the CMP composition (Q) has a pH in the range of from 6 to 9.

Z6:
(A) Colloidal silica particles (A) in a total amount of from 0.0001 to 2.5 wt.-% based on the total weight of the respective CMP composition
(B) is glycine, alanine, leucine, cysteine or a mixture or salt thereof in a total amount of from 0.45 to 0.82 wt.-% based on the total weight of the respective CMP composition
(C) at least one corrosion inhibitor in a total amount of from 0.001 to 0.02 wt.-% based on the total weight of the respective CMP composition
(D) hydrogen peroxide as oxidizing agent in a total amount of from 0.0001 to 2 wt.-% based on the total amount of the respective CMP composition
(E) aqueous medium
wherein the CMP composition (Q) has a pH in the range of from 6 to 9.5.

Z7:
(A) Colloidal silica particles (A) in a total amount of from 0.1 to 1.8 wt.-% based on the total weight of the respective CMP composition
(B) is glycine, alanine, leucine, cysteine or a mixture or salt thereof in a total amount of from 0.2 to 0.9 wt.-% based on the total weight of the respective CMP composition
(C) at least one corrosion inhibitor in a total amount of from 0.007 to 0.018 wt.-% based on the total weight of the respective CMP composition
(D) hydrogen peroxide as oxidizing agent in a total amount of from 0.0001 to 2 wt.-% based on the total amount of the respective CMP composition
(E) aqueous medium
wherein the CMP composition (Q) has a pH in the range of from 6 to 9.5.

Z8:
(A) Colloidal silica particles (A) in a total amount of from 0.1 to 1.8 wt.-% based on the total weight of the respective CMP composition
(B) is glycine, alanine, leucine, cysteine in a total amount of from 0.2 to 0.9 wt.-% based on the total weight of the respective CMP composition
(C) is 5 methyl-benzotriazole, 1,2,4 triazole, 1H-benzotriazole, benzotriazole or a mixture thereof in a total amount of from 0.007 to 0.018 wt.-% based on the total weight of the respective CMP composition
(D) hydrogen peroxide as oxidizing agent in a total amount of from 0.0001 to 2 wt.-% based on the total amount of the respective CMP composition
(E) aqueous medium
wherein the CMP composition (Q) has a pH in the range of from 6 to 9.5.

Z9:
(A) Colloidal or fumed inorganic particles (A) or a mixture thereof in a total amount of from 0.05 to 0.9 wt.-% based on the total weight of the respective CMP composition
(B) at least one amino acid in a total amount of from 0.2 to 0.9 wt.-% based on the total weight of the respective CMP composition
(C) at least one corrosion inhibitor in a total amount of from 0.008 to 0.02 wt.-% based on the total weight of the respective CMP composition
(D) hydrogen peroxide as oxidizing agent in a total amount of from 0.2 to 0.5 wt.-% based on the total amount of the respective CMP composition
(E) aqueous medium
wherein the CMP composition (Q) has a pH in the range of from 7.1 to 9.

Z10:
- (A) Colloidal or fumed inorganic particles (A) or a mixture thereof in a total amount of from 0.05 to 0.9 wt.-% based on the total weight of the respective CMP composition
- (B) at least one amino acid in a total amount of from 0.2 to 0.9 wt.-% based on the total weight of the respective CMP composition
- (C) at least one corrosion inhibitor in a total amount of from 0.008 to 0.02 wt.-% based on the total weight of the respective CMP composition
- (D) hydrogen peroxide as oxidizing agent in a total amount of from 0.4 to 1.75 wt.-% based on the total amount of the respective CMP composition
- (E) aqueous medium wherein the CMP composition (Q) has a pH in the range of from 7.1 to 9.

Processes for preparing CMP compositions are generally known. These processes may be applied to the preparation of the CMP composition of the invention. This can be carried out by dispersing or dissolving the above-described components (A), (B), (C), (D) and optional components (F) to (H) in the aqueous medium (E), preferably water, and optionally by adjusting the pH value through adding an acid, a base, a buffer or a pH adjusting agent. For this purpose the customary and standard mixing processes and mixing apparatuses such as agitated vessels, high shear impellers, ultrasonic mixers, homogenizer nozzles or counterflow mixers, can be used.

The polishing process is generally known and can be carried out with the processes and the equipment under the conditions customarily used for the CMP in the fabrication of wafers with integrated circuits. There is no restriction on the equipment with which the polishing process can be carried out.

As is known in the art, typical equipment for the CMP process consists of a rotating platen which is covered with a polishing pad. Also orbital polishers have been used. The wafer is mounted on a carrier or chuck. The side of the wafer being processed is facing the polishing pad (single side polishing process). A retaining ring secures the wafer in the horizontal position.

Below the carrier, the larger diameter platen is also generally horizontally positioned and presents a surface parallel to that of the wafer to be polished. The polishing pad on the platen contacts the wafer surface during the planarization process.

To produce material loss, the wafer is pressed onto the polishing pad. Both the carrier and the platen are usually caused to rotate around their respective shafts extending perpendicular from the carrier and the platen. The rotating carrier shaft may remain fixed in position relative to the rotating platen or may oscillate horizontally relative to the platen. The direction of rotation of the carrier is typically, though not necessarily, the same as that of the platen. The speeds of rotation for the carrier and the platen are generally, though not necessarily, set at different values. During the CMP process of the invention the CMP composition of the invention is usually applied onto the polishing pad as a continuous stream or in dropwise fashion. Customarily, the temperature of the platen is set at temperatures of from 10 to 70° C.

The load on the wafer can be applied by a flat plate made of steel for example, covered with a soft pad that is often called backing film. If more advanced equipment is being used a flexible membrane that is loaded with air or nitrogen pressure presses the wafer onto the pad. Such a membrane carrier is preferred for low down force processes when a hard polishing pad is used, because the down pressure distribution on the wafer is more uniform compared to that of a carrier with a hard platen design. Carriers with the option to control the pressure distribution on the wafer may also be used according to the invention. They are usually designed with a number of different chambers that can be loaded to a certain degree independently from each other.

For further details reference is made to WO 2004/063301 A1, in particular page 16, paragraph [0036] to page 18, paragraph [0040] in conjunction with the FIG. 2.

By way of the CMP process of the invention and/or using the CMP composition of the invention, wafers with integrated circuits comprising a surface region containing or consisting of cobalt or cobalt and copper and/or of a cobalt alloy can be obtained which have an excellent functionality.

The CMP composition of the invention can be used in the CMP process as ready-to-use slurry, they have a long shelf-life and show a stable particle size distribution over long time. Thus, they are easy to handle and to store. They show an excellent polishing performance, particularly a controllable and adjustable selectivity between cobalt and copper by the combination of high material removal rate (MRR) of cobalt and low MRR of copper or the other way round. Since the amounts of its components are held down to a minimum, the CMP composition according to the invention respectively can be used in a cost-effective way.

EXAMPLES AND COMPARATIVE EXAMPLES

The general procedure for the CMP experiments is described below.

Standard CMP process for 200 mm Co/Co wafers:

Strasbaugh nSpire (Model 6EC), ViPRR floating retaining ring Carrier;

| | |
|---|---|
| down pressure: | 1.5 psi; |
| back side pressure: | 1.0 psi; |
| retaining ring pressure: | 1.0 psi; |
| polishing table/carrier speed: | 130/127 rpm; |
| slurry flow rate: | 300 ml/min; |
| polishing time: | 15 s; (Co) |
| | 60 s; (Cu) |

-continued

| | |
|---|---|
| polishing pad: | Fujibo H800; |
| backing film: | Strasbaugh, DF200 (136 holes); |
| conditioning tool: | Strasbaugh, soft brush, ex-situ; after each wafer the pad is conditioned for the next processing of an other wafer by 2 sweeps with 5 lbs down force. The brush is soft. This means even after 200 sweeps the brush will not have caused a significant removal rate on the soft polishing pad. |

Three dummy TEOS wafers are polished with 60 s before the metal wafers are polished (Co wafer is polished for 15 s, Cu for 60 s).

The slurry is stirred in the local supply station.

Standard analysis procedure for (semi) metal blanket wafers at:

Removal rate is determined by difference of weight of the wafers pre and post CMP by a Sartorius LA310 S scale or a NAPSON 4-point probe station.

The radial uniformity of removal rate is assessed by 39 point diameter scan (range) using NAPSON 4-point probe station.

Standard consumables for CMP of metal film coated wafers at:

Cu films: ECP (supplied by Ramco);

Co films: 2000 Å PVD Co on Ti liner (Supplier: ATMI);

Low k material: black diamond $1^{st}$ generation (referred to as "BD1" in the following);

The pH—value is measured with a pH combination electrode (Schott, blue line 22 pH electrode).

Standard procedure for slurry preparation:

An aqueous solution of glycine 4.2 wt. % is prepared by dissolving the desired amount of glycine in ultra-pure water. After stirring for 20 min the solution is neutralized and the pH is adjusted to pH 8.05±0.1 by adding an 4.8 wt. % aqueous solution of KOH. Balance water may be added to adjust concentration. An aqueous solution of BTA 0.34 wt. % is prepared by dissolving the desired amount of BTA in ultra-pure water and stirring for 30 minutes until all of the solid BTA is dissolved. The 1 wt. % non-ionic surfactant stock solution is prepared by dissolving the desired amount of surfactant (F) (for example Triton™ DF 16 from Dow) in ultra-pure water by stirring for 30 minutes.

To prepare the CMP slurry of the examples the glycine (amino acid (B)) solution, the BTA (corrosion inhibitor (C)) solution and the surfactant (F) solution are mixed and a solution of colloidal silica particles (30% stock solution of (A) for example Fuso® PL 3) is added under continuous stirring. After the complete addition of the desired amount of abrasive (A) the dispersion is stirred for additional 5 minutes. Then the pH is adjusted to 8.3±0.1 by adding an 4.8 wt. % aqueous solution of KOH. Balance water is added under stirring to adjust the concentration of the CMP slurry to the values listed in the tables 2, 3, 4 and 5 of the examples and comparative examples below. Thereafter the dispersion is filtered by passing through a 0.2 μm filter at room temperature. The desired amount of $H_2O_2$ (D) is added right before (1 to 15 min) before the slurry is used for CMP.

The slurries for the examples Comp. Ex V3. V4, V5 and V6 were prepared according to a modified version of the standard slurry preparation procedure. A slurry according to standard procedure was prepared but without BTA (C). The necessary amount of BTA (C) was added (1% stock solution) subsequently under stirring. The desired amount of $H_2O_2$ (D) is added right before (1 to 15 min) the slurry is used for CMP.

The slurries for the examples Comp. Ex V7 to V15 were prepared with a modified version of the standard slurry preparation procedure. 450 g of Fuso® PL3 Silica (A) dispersion (20.0%) were added under stirring to 1550 g slurry prepared according to standard preparation procedure giving a slurry of 4.9% Silica, 80 ppm BTA (C), 0.58% glycine (B), 0.023% Triton™ DF16 (F), pH 7.9. The desired amount of $H_2O_2$ (D) is added right before (1 to 15 min) the slurry is used for CMP.

Inorganic Particles (A) Used in the Examples

Colloidal cocoon-shaped Silica particles having an average primary particle size (d1) of 35 nm and an average secondary particle size (d2) of 70 nm (as determined using dynamic light scattering techniques via a Horiba instrument) (for example Fuso® PL-3) were used.

TABLE 1

Experimental results of particle shape analysis of cocoon-shaped silica particles (A)

| statistical function unit | ECD nm | shericity | shape factor |
|---|---|---|---|
| number of particles | 475 | 475 | 475 |
| average | 53.67 | 0.631 | 0.881 |
| minimum | 33.68 | 0.150 | 0.513 |
| maximum | 99.78 | 0.997 | 0.978 |
| standard deviation | 11.69 | 0.199 | 0.083 |
| median d50 | 51.32 | 0.662 | 0.911 |
| d90 | | | 0.955 |

Procedure for Particle Shape Characterization

An aqueous cocoon-shaped silica particle dispersion with 20 wt. % solid content was dispersed on a carbon foil and was dried. The dried dispersion was analyzed by using Energy Filtered-Transmission Electron Microscopy (EF-TEM) (120 kilo volts) and Scanning Electron Microscopy secondary electron image (SEM-SE) (5 kilo volts). The EF-TEM image with a resolution of 2 k, 16 Bit, 0.6851 nm/pixel (FIG. 4) was used for the analysis. The images were binary coded using the threshold after noise suppression. Afterwards the particles were manually separated. Overlying and edge particles were discriminated and not used for the analysis. ECD, shape factor and sphericity as defined before were calculated and statistically classified.

If present as surfactant (F) an amphiphilic non-ionic polyoxyethylene-polyoxypropylene alkyl ether surfactant is used, which is a mixture of molecules containing, on the average, an alkyl group having 6 to 12 carbon atoms and 2 to 10 oxyethylene monomer units and 1 to 5 oxypropylene monomer units in random distribution (for example Triton™ DF 16 from DOW).

TABLE 2

CMP compositions of example 1 to 9 and of the comparative examples V1 to V2 with different $H_2O_2$ (D) concentrations, their pH values as well as their MRR (material removal rate) and selectivity data in the CMP process using these compositions, wherein the aqueous medium (E) is ultra-pure water (wt. % = percent by weight; BD1 = black diamond $1^{st}$ generation)

| Example | Formulation Composition [wt. %] | pH | $H_2O_2$ (D) [wt. %] | Co MRR [Å/min] | Cu MRR [Å/min] | Selectivity. Co/Cu | BD1 MRR [Å/min] |
|---|---|---|---|---|---|---|---|
| Comp Ex V1 | 0.5 colloidal silica (A), 0.01 BTA (C), 0.75 glycine (B), 0.03 (F) | 8.3 | 0.0 | 464 | 100 | 4.6 | 4 |
| Ex 1 | 0.5 colloidal silica (A), 0.01 BTA (C), 0.75 glycine (B), 0.03 (F) | 8.3 | 0.05 | 3068 | 162 | 18.9 | 7 |
| Ex 2 | 0.5 colloidal silica (A), 0.01 BTA (C), 0.75 glycine (B), 0.03 (F) | 8.3 | 0.1 | 3896 | 95 | 41.0 | 6 |
| Ex 3 | 0.5 colloidal silica (A), 0.01 BTA (C), 0.75 glycine (B), 0.03 (F) | 8.3 | 0.2 | 4520 | 849 | 5.3 | 5 |
| Ex 4 | 0.5 colloidal silica (A), 0.01 BTA (C), 0.75 glycine (B), 0.03 (F) | 8.3 | 0.3 | 5312 | 1482 | 3.6 | 6 |
| Ex 5 | 0.5 colloidal silica (A), 0.01 BTA (C), 0.75 glycine (B), 0.03 (F) | 8.3 | 0.4 | 5868 | 1789 | 3.3 | 3 |
| Ex 6 | 0.5 colloidal silica (A), 0.01 BTA (C), 0.75 glycine (B), 0.03 (F) | 8.3 | 0.5 | 5452 | 2070 | 2.6 | — |
| Ex 7 | 0.5 colloidal silica (A), 0.01 BTA (C), 0.75 glycine (B), 0.03 (F) | 8.3 | 0.75 | 1980 | 2205 | 0.9 | — |
| Ex 8 | 0.5 colloidal silica (A), 0.01 BTA (C), 0.75 glycine (B), 0.03 (F) | 8.3 | 1.0 | 1532 | 2180 | 0.7 | 5 |
| Ex 9 | 0.5 colloidal silica (A), 0.01 BTA (C), 0.75 glycine (B), 0.03 (F) | 8.3 | 1.75 | 660 | 2188 | 0.3 | 0 |
| Comp Ex V2 | 0.5 colloidal silica (A), 0.01 BTA (C), 0.75 glycine (B), 0.03 surfactant (F) | 8.3 | 2.5 | 608 | 2088 | 0.3 | 3 |

Figure 5:
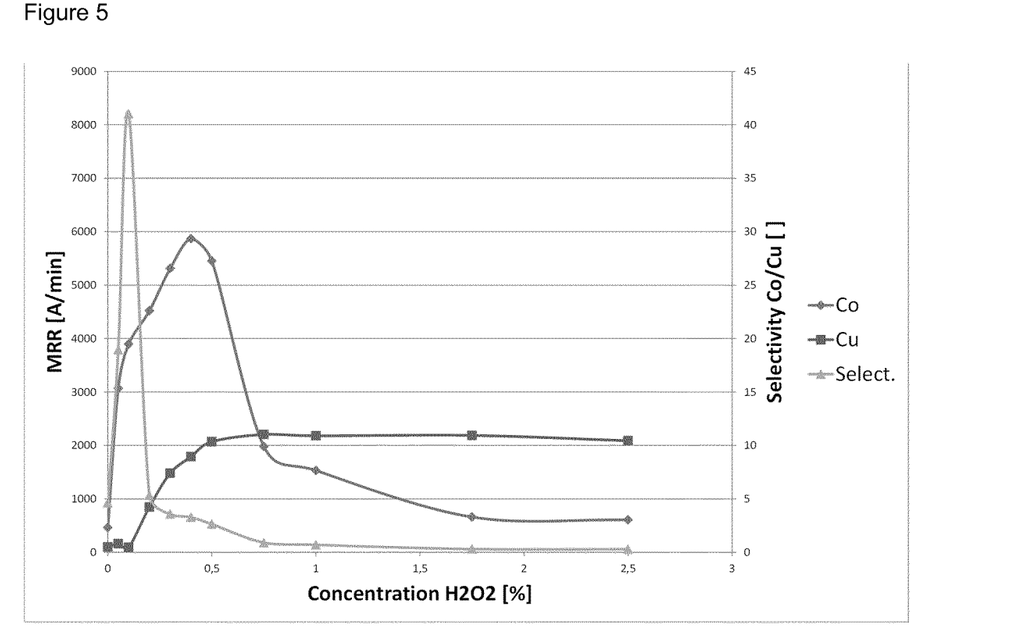
FIG. 5: Cu and Co material removal rate as well as Co to Cu selectivity at low abrasive concentration of 0.5 wt. % (A) in dependency of the $H_2O_2$ concentration

As can be seen in FIG. 5 the material removal rate is strongly dependent from the $H_2O_2$ concentration. For the copper material removal rate 3 types of regions can be defined in dependency of the $H_2O_2$ concentration. In the range from 0 to 0.1 wt. % $H_2O_2$ the copper removal rate is very low and not influenced by an increase in the $H_2O_2$ concentration. In the range of from 0.2 wt. % to 0.5 wt. % $H_2O_2$ the copper removal rate increases. In the range of from 0.5 to 2.0 wt. % $H_2O_2$ the copper removal rate is independent from an increase of the $H_2O_2$ concentration. In contrast to that the cobalt removal rate increases already with very low $H_2O_2$ concentrations of at least 0.05 wt. %. The cobalt removal rate reaches a maximum at 0.4 wt. % $H_2O_2$ and then decreases. Based on this surprisingly found dependency the selectivity of cobalt to copper can be easily adjusted by varying the $H_2O_2$ concentration.

TABLE 3

CMP compositions of example 10 to 11 and of the comparative examples V3 to V6 with different corrosion inhibitor (C) and $H_2O_2$ (D) concentrations, their pH values as well as their MRR (material removal rate) and selectivity data in the CMP process using these compositions, wherein the aqueous medium (E) is ultra-pure water (wt. % = percent by weight)

| Example | Formulation Composition [wt. %] | pH | $H_2O_2$ (D) [wt. %] | BTA (C) [wt. %] | Co MRR [Å/min] | Cu MRR [Å/min] |
|---|---|---|---|---|---|---|
| Ex 10 | 0.5 colloidal silica (A), 0.75 glycine (B), 0.03 (F) | 8.3 | 0.5 | 0.01% | 5452 | 2070 |
| Comp. Ex V3 | 0.5 colloidal silica (A), 0.75 glycine (B), 0.03 (F) | 8.3 | 0.5 | 0.03% | 1394 | 249 |
| Comp. Ex V4 | 0.5 colloidal silica (A), 0.75 glycine (B), 0.03 (F) | 8.3 | 0.5 | 0.05% | 388 | 57 |
| Comp. Ex V5 | 0.5 colloidal silica (A), 0.75 glycine (B), 0.03 (F) | 8.3 | 1.0 | 0 | 2736 | 7069 |

TABLE 3-continued

CMP compositions of example 10 to 11 and of the comparative examples V3 to V6 with different corrosion inhibitor (C) and $H_2O_2$ (D) concentrations, their pH values as well as their MRR (material removal rate) and selectivity data in the CMP process using these compositions, wherein the aqueous medium (E) is ultra-pure water (wt. % = percent by weight)

| Example | Formulation Composition [wt. %] | pH | $H_2O_2$ (D) [wt. %] | BTA (C) [wt. %] | Co MRR [Å/min] | Cu MRR [Å/min] |
|---|---|---|---|---|---|---|
| Ex 11 | 0.5 colloidal silica (A), 0.75 glycine (B), 0.03 (F) | 8.3 | 1.0 | 0.01% | 1532 | 2180 |
| Comp. Ex V6 | 0.5 colloidal silica (A), 0.75 glycine (B), 0.03 (F) | 8.3 | 1.0 | 0.05% | 372 | 128 |

The variation of the corrosion inhibitor concentration (C) (for example BTA) shows a strong effect on the cobalt and copper material removal rate.

TABLE 4

CMP compositions of the comparative examples V7 to V15 with high particles (A) concentration and different $H_2O_2$ (D) concentrations, their pH values as well as their MRR (material removal rate) and selectivity data in the CMP process using these compositions, wherein the aqueous medium (E) is ultra-pure water (wt. % = percent by weight)

| Example | Formulation Composition [wt. %] | $H_2O_2$ (D) [wt. %] | pH | Co MRR [Å/min] | Cu MRR [Å/min] | Selectivity. Co/Cu |
|---|---|---|---|---|---|---|
| Comp. Ex V7 | 4.9 colloidal silica (A), 0.008 BTA (C), 0.58 glycine (B), 0.023 (F) | 0 | 7.9 | 608 | 143 | 4.3 |
| Comp. Ex V8 | 4.9 colloidal silica (A), 0.008 BTA (C), 0.58 glycine (B), 0.023 (F) | 0.2 | 7.9 | 5356 | 995 | 5.4 |
| Comp. Ex V9 | 4.9 colloidal silica (A), 0.008 BTA (C), 0.58 glycine (B), 0.023 (F) | 0.4 | 7.9 | 6516 | 2501 | 2.6 |
| Comp. Ex V10 | 4.9 colloidal silica (A), 0.008 BTA (C), 0.58 glycine (B), 0.023 (F) | 0.5 | 7.9 | 6052 | 2990 | 2.0 |
| Comp. Ex V11 | 4.9 colloidal silica (A), 0.008 BTA (C), 0.58 glycine (B), 0.023 (F) | 0.75 | 7.9 | 5764 | 3408 | 1.7 |
| Comp. Ex V12 | 4.9 colloidal silica (A), 0.008 BTA (C), 0.58 glycine (B), 0.023 (F) | 1.0 | 7.9 | 3000 | 2980 | 1.0 |
| Comp. Ex V13 | 4.9 colloidal silica (A), 0.008 BTA (C), 0.58 glycine (B), 0.023 (F) | 1.5 | 7.9 | 1920 | 2768 | 0.7 |
| Comp. Ex V14 | 4.9 colloidal silica (A), 0.008 BTA (C), 0.58 glycine (B), 0.023 (F) | 2.0 | 7.9 | 1330 | 2741 | 0.5 |
| Comp. Ex V15 | 4.9 colloidal silica (A), 0.008 BTA (C), 0.58 glycine (B), 0.023 (F) | 2.5 | 7.9 | 1072 | 2380 | 0.5 |

Figure 6:
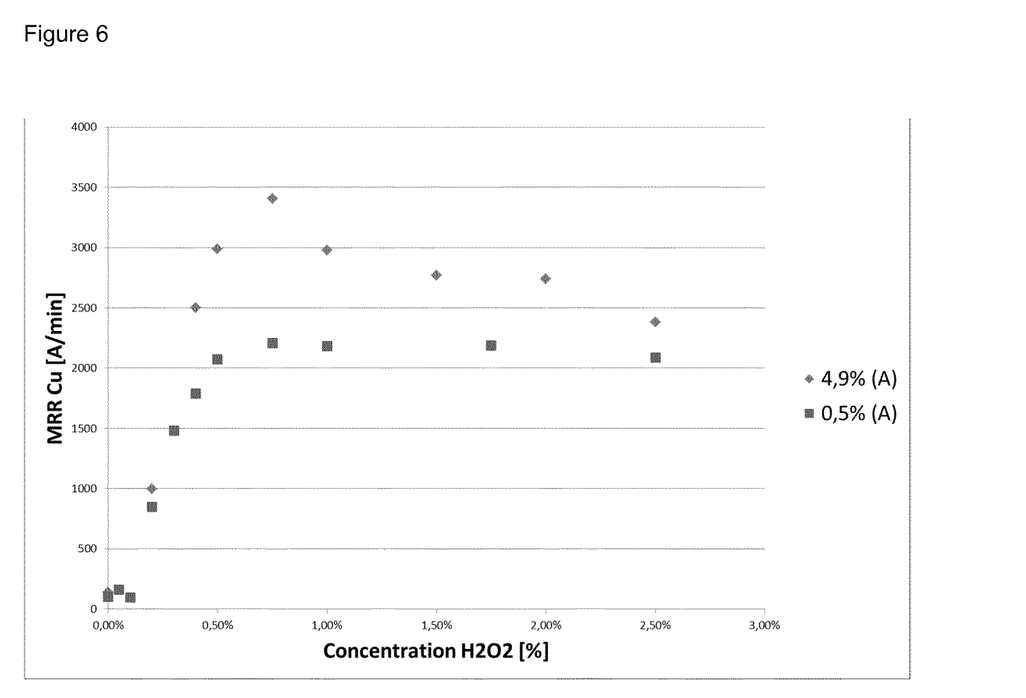
FIG. 6: Cu material removal rate in dependency of the $H_2O_2$ concentration at low particles concentration of 0.5 wt. % (A) and at high particles concentration of 4.9 wt. % (A).

At high particles (A) concentration the dependency of the copper removal rate from the $H_2O_2$ (D) concentration is different compared to the afore mentioned situation at low particles (A) concentration according to the invention. The copper removal rate is showing a pronounced maximum (see FIG. 6). The selectivity control of cobalt to copper is not possible at high particles (A) concentration.

TABLE 5

CMP compositions of the example 12 and the comparative examples
V16 to V17, their pH values as well as their MRR (material removal rate)
data in the CMP process under different down pressure using these
compositions, wherein the aqueous medium (E) is ultra-pure water
(wt. % = percent by weight)

| Example | Formulation Composition [wt. %] | pH | Down pressure [psi] | Retaining ring pressure [psi] | Co MRR [A/min] | Cu MRR [A/min] |
|---|---|---|---|---|---|---|
| Ex 12 | 0.5 colloidal silica (A), 0.01 BTA (C), 0.75 glycine (B), 1 $H_2O_2$ (D), 0.03 (F) | 8.3 | 1.5 | 2.5 | 1558 | 1583 |
| Comp Ex V16 | 0.5 colloidal silica (A), 0.01 BTA (C), 0.75 glycine (B), 1 $H_2O_2$ (D), 0.03 (F) | 8.3 | 2.0 | 3.0 | 3357 | 2032 |
| Comp Ex V17 | 0.5 colloidal silica (A), 0.01 BTA (C), 0.75 glycine (B), 1 $H_2O_2$ (D), 0.03 (F) | 8.3 | 2.5 | 3.5 | 5968 | 2463 |

Figure 7:
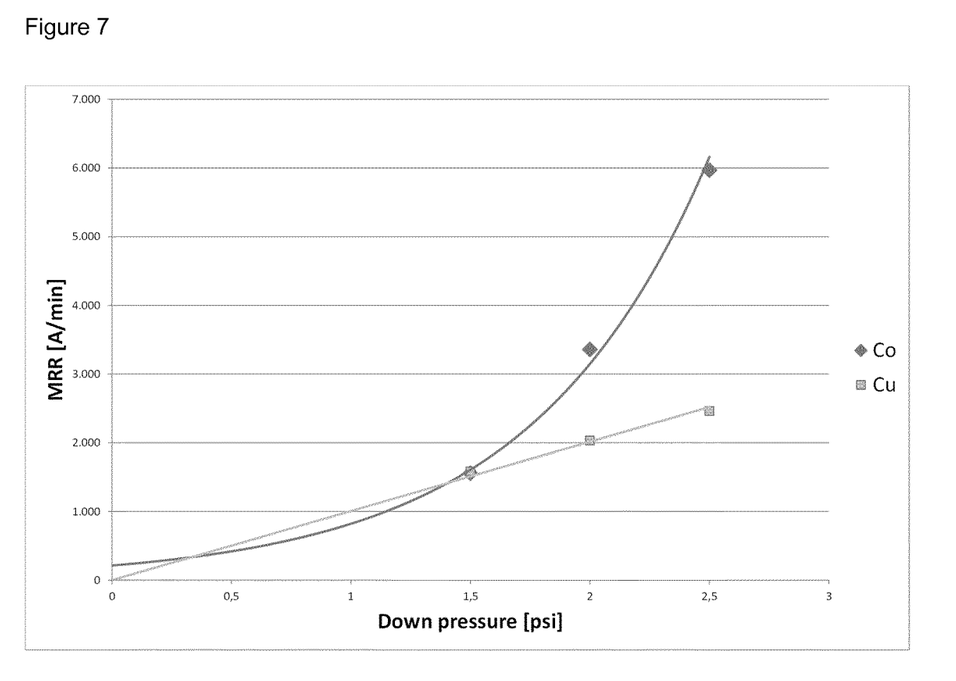
FIG. 7: Dependency of the Co and Cu material removal rate from the down pressure at 1 wt. % $H_2O_2$ concentration.

The copper removal rate increases in a linear way by increasing the down pressure. In contrast to that, a linear increase of down pressure leads to an exponential increase of the cobalt material removal rate (see FIG. 7). In order to have a controllable process in terms of the cobalt material removal rate the low down pressure regime according to the invention is favorable.

The CMP compositions of the examples 1 to 12 according to the invention are showing improved performance, in terms of cobalt to copper selectivity, high material removal rates of cobalt at low abrasive (A) concentration, low material removal rates of the low k material, for example black diamond $1^{st}$ generation (BD1), a low etching behavior and a high dispersion stability. The selectivity can be increased by up to a factor of 41 by using CMP compositions according to the invention. By varying the amount of the $H_2O_2$ (D) at low particles (A) concentration the selectivity can be adjusted within a wide range.

The invention claimed is:

1. A chemical mechanical polishing (CMP) composition, comprising
   (A) colloidal or fumed inorganic particles (A) or a mixture thereof in a total amount of from 0.1 to 2.5 wt.-% based on a total weight of the CMP composition,
   (B) at least one amino acid in a total amount of from 0.2 to 1 wt.-% based on the total weight of the CMP composition,
   (C) at least one corrosion inhibitor in a total amount of from 0.001 to 0.02 wt.-% based on the total weight of the CMP composition
   (D) hydrogen peroxide as an oxidizing agent in a total amount of from 0.0001 to 2 wt.-% based on the total amount of the CMP composition, and
   (E) an aqueous medium,
   wherein the CMP composition has a pH of from 7 to 8.8.

2. The CMP composition according to claim 1, wherein the inorganic particles (A) are colloidal particles.

3. The CMP composition according to claim 1, wherein the inorganic particles (A) are fumed particles.

4. The CMP composition according to claim 1, wherein the inorganic particles (A) are silica particles.

5. The CMP composition according to claim 1, wherein a mean particle size of the particles (A) is from 20 nm to 200 nm, as determined by a dynamic light scattering technique.

6. The CMP composition according to claim 1, wherein the at least one amino acid (B) is selected from the group consisting of glycine, arginine, lysine, alanine, leucine, valine, histidine, cysteine, serine and proline.

7. The CMP composition according to claim 1, wherein the at least one corrosion inhibitor (C) is selected from the group consisting of benzotriazole, methyl-benzotriazole and 1,2,4 triazole.

8. The CMP composition according to claim 1, further comprising at least one surfactant (F) in a total amount of from 0.001 to 0.05 wt.-% based on the total weight of the CMP composition.

9. The CMP composition according to claim 8, wherein the at least one surfactant (F) is an amphiphilic non-ionic surfactant comprising a polyoxyalkylene group.

10. The CMP composition according to claim 9, wherein
    the inorganic particles (A) are colloidal silica particles,
    the at least one amino acid (B) is selected from the group consisting of glycine, arginine, lysine, alanine, leucine, valine, histidine, cysteine, serine and proline, and
    the at least one corrosion inhibitor (C) is selected from the group consisting of benzotriazole, methyl-benzotriazole and 1,2,4 triazole.

11. The CMP composition according to claim 9, wherein
    the inorganic particles (A) are colloidal silica particles,
    the at least one amino acid (B) is glycine, and
    the at least one corrosion inhibitor (C) is benzotriazole.

12. The CMP composition according to claim 11, comprising:
    the inorganic particles (A), which are colloidal silica particles, in an amount of 0.4 to 1.5 wt.-% based on a total weight of the CMP composition;
    the at least one amino acid (B), which is glycine, in an amount of 0.3 to 0.78 wt.-% based on a total weight of the CMP composition;
    the at least one corrosion inhibitor (C), which is benzotriazole, in an amount of 0.005 to 0.02 wt.-% based on a total weight of the CMP composition;
    hydrogen peroxide (D) in a total amount of from 0.02 to 1.9 wt.-% based on the total amount of the CMP composition;
    the aqueous medium (E); and
    the at least one surfactant (F), in an amount of 0.008 to 0.05 wt.-% based on a total weight of the CMP composition.

13. The CMP composition according to claim 1, comprising:
- the inorganic particles (A), which are colloidal silica particles, in an amount of 0.1 to 1.5 wt.-% based on a total weight of the CMP composition;
- the at least one amino acid (B), which is glycine, in an amount of 0.3 to 0.78 wt.-% based on a total weight of the CMP composition;
- the at least one corrosion inhibitor (C), which is benzotriazole, in an amount of 0.005 to 0.02 wt.-% based on a total weight of the CMP composition;
- hydrogen peroxide (D) in a total amount of from 0.05 to 1.0 wt.-% based on the total amount of the CMP composition; and
- the aqueous medium (E).

14. The CMP composition according to claim 1, comprising:
- the inorganic particles (A), which are colloidal silica particles, in an amount of 0.5 to 1.5 wt.-% based on a total weight of the CMP composition;
- the at least one amino acid (B), which is glycine, in an amount of 0.3 to 0.78 wt.-% based on a total weight of the CMP composition;
- the at least one corrosion inhibitor (C), which is benzotriazole, in an amount of 0.005 to 0.02 wt.-% based on a total weight of the CMP composition;
- hydrogen peroxide (D) in a total amount of from 0.05 to 1.0 wt.-% based on the total amount of the CMP composition; and
- the aqueous medium (E).

15. A method for polishing a substrate, the method comprising: chemical-mechanically polishing the substrate with the CMP composition according to claim 1, wherein the substrate comprises
   (i) cobalt or
   (ii) cobalt and copper and /or
   (iii) a cobalt alloy.

16. A process for manufacturing a semiconductor device, the process comprising: chemical-mechanically polishing a substrate comprising a surface region containing cobalt or cobalt and copper and/or of a cobalt alloy in the presence of the CMP composition according to claim 1.

17. The process according to claim 16, wherein the chemical mechanical polishing is performed at a down pressure of 13.8 kPa or lower.

18. The process according to claim 16, wherein a selectivity of cobalt to copper material removal rate is in a range of from 0.1 to 50.

19. The process according to claim 16, wherein a hydrogen peroxide concentration is varied during the polishing.

20. The process according to claim 16, wherein the surface region consists of cobalt or cobalt and copper and/or a cobalt alloy.

* * * * *

UNITED STATES PATENT AND TRADEMARK OFFICE
CERTIFICATE OF CORRECTION

| | |
|---|---|
| PATENT NO. | : 10,570,316 B2 |
| APPLICATION NO. | : 15/325464 |
| DATED | : February 25, 2020 |
| INVENTOR(S) | : Robert Reichardt et al. |

Page 1 of 1

It is certified that error appears in the above-identified patent and that said Letters Patent is hereby corrected as shown below:

In the Drawings

In sheet 3 of 4, FIG. 5, X-axis, Line 1, "H2O2" should read -- $H_2O_2$ --.

In sheet 3 of 4, FIG. 6, X-axis, Line 1, "H2O2" should read -- $H_2O_2$ --.

In the Specification

In Column 4, Line 6, "Technol;" should read -- Technol. --.

In Column 6, Line 49, "rates" should read -- rates. --.

In Column 8, Line 62, "nonionic" should read -- non-ionic --.

In Column 8, Line 66, "nonionic" should read -- non-ionic --.

In Column 9, Line 4, "blocklike" should read -- block-like --.

In Column 9, Line 5, "blocklike" should read -- block-like --.

In Column 13, Line 52, "psi)" should read -- psi). --.

In Column 20, Line 34 (approx.), "shericity" should read -- sphericity --.

In the Claims

In Column 25, Line 44, Claim 1, "comprising" should read -- comprising: --.

In Column 25, Line 53, Claim 1, "composition" should read -- composition, --.

Signed and Sealed this
Twenty-third Day of June, 2020

Andrei Iancu
*Director of the United States Patent and Trademark Office*